(No Model.)
J. HARTMAN.
GATE.
No. 326,870. Patented Sept. 22, 1885.
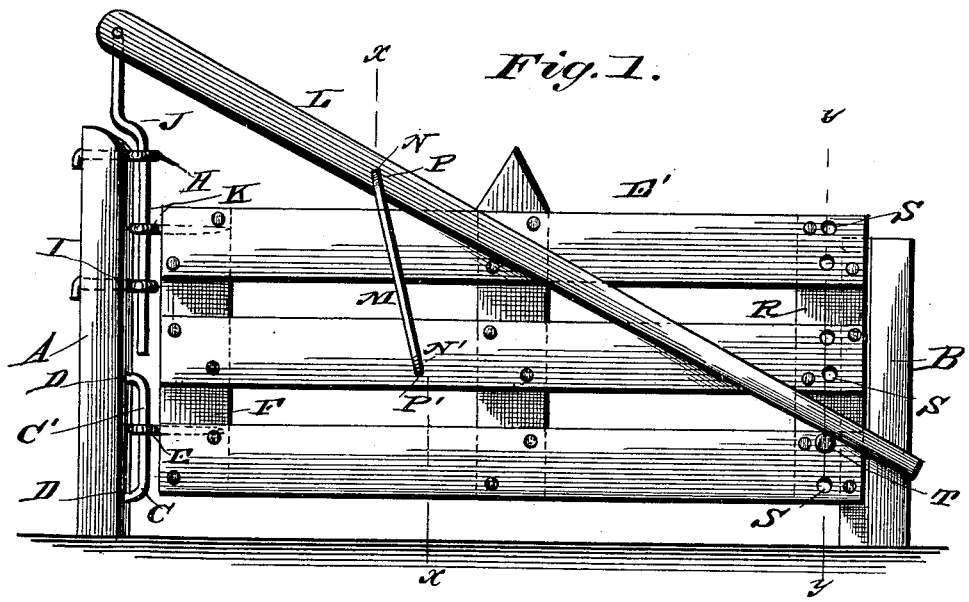
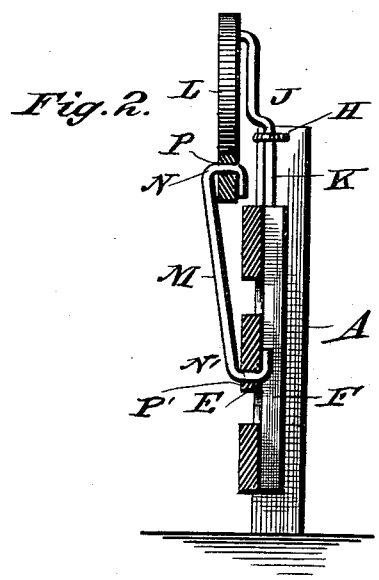
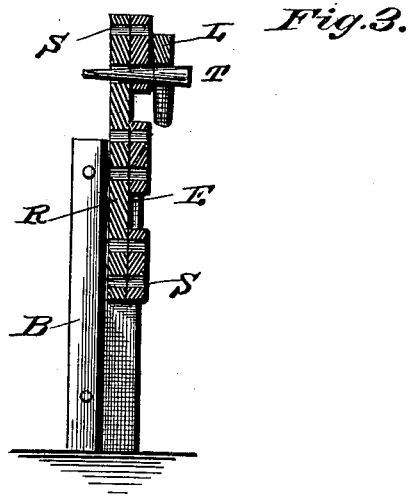
WITNESSES
Phil C Masi.
John T. Morrow.
INVENTOR
James Hartman
by, Anderson & Smith
his Attorneys

UNITED STATES PATENT OFFICE.

JAMES HARTMAN, OF GRANT, INDIANA.

GATE.

SPECIFICATION forming part of Letters Patent No. 326,870, dated September 22, 1885.

Application filed May 15, 1885. (No model.)

*To all whom it may concern:*

Be it known that I, JAMES HARTMAN, a citizen of the United States, residing at Grant, in the county of Fulton and State of Indiana, have invented certain new and useful Improvements in Gates; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a front elevation. Fig. 2 is a vertical section on line $x\,x$. Fig. 3 is a vertical section on line $y\,y$.

This invention has relation to gates; and it consists in the construction and novel combination of parts, as will be hereinafter fully described, and particularly pointed out in the claim.

Referring by letter to the accompanying drawings, A designates the hinge-post, and B the latch-post, of the gate. The hinge-post A is provided with a lower hinge-bearing, C, which is constructed of an iron rod, C', bent at its ends to form staple-arms D, which are pointed so that they may be driven into the hinge-post. The rod C' is inserted into the eye of the eyebolt E, which is screwed or driven into the rear batten, F, of the gate G before the rod C' is passed through the eye or driven into the hinge-post. Two eyebolts, H I, are screwed or driven into the hinge-post, the one H near the upper end of the post and the one I some distance below the bolt H. The upper pintle, J, of the gate consists of a straight rod, K, having its upper end bent at right angles to its main portion and passed through the upper end of the operating-lever L. The lever L is connected to the gate by a rod, M, which is bent at its ends to form hooks N N', which are passed through holes P P', the former in the lever and the latter in, preferably, the middle horizontal rail of the gate. The ends of the hooks or bends are then clinched by driving them in against the material of the lever and board to hold them in place.

The front batten, R, of the gate is provided with any desired number of holes S for the reception of a pin, T, by which the power end of the lever L is kept elevated in the desired position. By changing the pin to the desired hole S the gate may be raised and lowered to permit small stock—such as sheep and hogs—to pass under it, or to avoid deep snow in the winter season.

I am aware that it is not new to provide a gate with a vertically-vibrating lever pivoted at one end to the gate-post, having an intermediate pivoted connection with the gate, and its opposite end designed to engage pins on the forward batten of the gate, and that it is also old to have a similar lever connect with an angular hinge-pintle, and I therefore do not claim such devices broadly.

Having thus fully described my invention, what I claim as new, and desire to secure by Letters Patent of the United States, is—

The combination, with the hinge-post provided with the lower hinge-bearing, C, and the eyebolts H I, of the gate G, provided with the eyebolts in its rear batten, and the pin-holes and pin in its front batten, the rod K, the lever L, and the hook-rod connecting the lever and gate, substantially as specified.

In testimony whereof I affix my signature in presence of two witnesses.

JAMES HARTMAN.

Witnesses:
MILTON O. REES,
ISAIAH WALKER.